May 17, 1927.  F. S. UPHAM  1,629,326
TOP
Filed Oct. 19, 1925

Witness
Ray Fisher

Inventor
Franklin S. Upham
by Baird & Freeman Attorneys

Patented May 17, 1927.

1,629,326

UNITED STATES PATENT OFFICE.

FRANKLIN S. UPHAM, OF DES MOINES, IOWA.

TOP.

Application filed October 19, 1925. Serial No. 63,319.

The object of my invention is to provide a top having a fly wheel mounted thereon wherein the fly wheel may move relative to the top itself so that different positions of the fly wheel may be secured relative to the spinner portion of the top.

Still a further object is to provide a top having a spinner including a cone shaped member, a shank of substantial diameter which receives the fly wheel of the top and a spindle of substantially small diameter so that the spinning of the top may be easily obtained by wrapping a cord around the spindle and then pulling the cord for imparting rotation to the spinner and the fly wheel mounted thereon.

Still a further object is to provide a fly wheel which relies upon friction between itself and the spinner to hold it relative to the spinner so that in order to properly spin the top it is necessary to start the pull upon the cord which rotates the spinner quite slowly until sufficient momentum is obtained for insuring the proper spinning of the top.

Still a further object is to provide a plurality of rings which may be dropped on to the spindle of the spinner while it is in motion, the rings being of several different colors so that various combinations of colors may be obtained, while the top is spinning and various positions of colors will be had when the top ceases to spin.

Still a further object is to provide an indicator on the spinner of the numbers on the fly wheel or vice versa so that the top may be used as a game where points will be scored depending upon just where the position of the spinner is relative to the fly wheel when the top ceases to spin.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1:
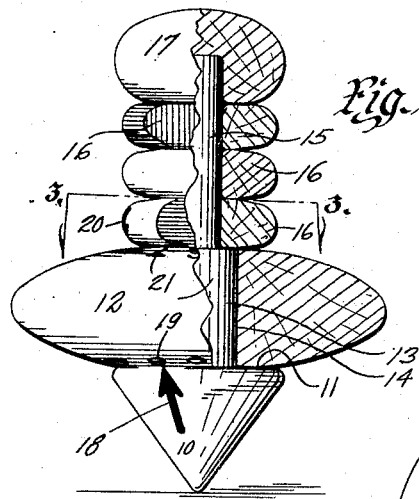
Figure 1 is a plan view of my improved top complete with the rings used therewith, parts being shown in section to better illustrate the construction.
Figure 3:
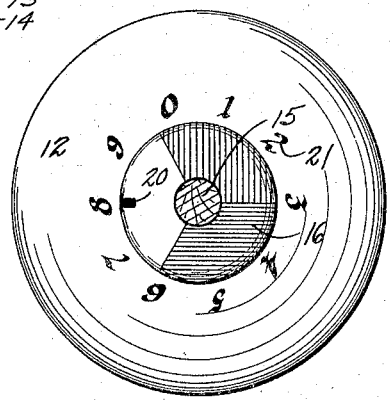
Figure 3 is a sectional view taken on line 3—3 of Figure 1.
Figure 2:
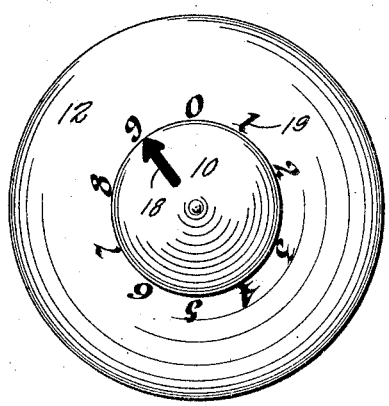
Figure 2 is an underside view of the top.

In the accompanying drawings, I have used the reference numeral 10 to indicate the cone shaped spinner which is formed with a flat upper surface 11 upon which rests a balance or fly wheel 12.

Formed integral with the spinner 10 is a shank 13 of substantial diameter.

The fly wheel 12 is formed with a substantial opening 14 of sufficient diameter to receive the shank 13 therein.

An elongated spindle 15 extends up above the shank 13 and is formed integral therewith. The shank 13 is of the same length as the fly wheel 12, as clearly shown in Figure 1 of the drawings.

In order to spin the top the fly wheel 12 and the spinner 13 are connected together and a cord (not shown) as wound around the spindle 15 and by commencing to unwind the cord relatively slow at the start and faster toward the end, I am able to spin the top relying upon friction between the balance wheel 12 and the spinner and shank 10 and 13. The knob 17 at the upper end of the spindle serves as a holder or handle whereby to engage and hold the top in position while the unwinding of the cord is done and the top put into spinning motion.

In the event that the operator of the top begins to spin the same quite rapidly at the start, then in that case the fly wheel 12 will slip relative to the spinner 10 and the spinning of the top will not be effective, and the time of spinning will be quite short.

By starting to spin slowly the balance wheel so serves as a real balance wheel and insures spinning for quite some time.

The shank 13 assists materially in the proper frictional engagement between the balance wheel 12 and the spinner 10.

After the top has been spinning for sometime the operator may drop rings 16 upon the spindle 15 and the rings 16 may be of different colors.

In the drawings, I have shown the rings of red, white and blue. A knob 17 may be placed over the upper end of the spindle after the rings 15 are in place.

Upon the spinner 10, I place a pointer or indicator 18 and upon the underside of the fly wheel 12, I place a series of numbers referred to by the reference numeral 19.

When the top is played and points are to be scored, then the player gets as many points as the number closest to the indicator 18. For example, if the top stops spinning and the indicator points at 9, then the player gets nine points for his credit.

An indicator 20 may be placed upon one of the rings 16 and numbers 21 placed upon the top of the fly wheel 12, and these points may be counted, if desired, the same as the points shown on the underside of the fly wheel 12.

If it is desired to have additional means of scoring, then points may be counted when the red of one ring 16 registers with the red of another ring 16.

The same may be true for the white and blue.

The arrangement of colors on the ring 16 add materially to the appearance of the spinning top and at the same time serve as a means of scoring points in case it is desired to play that way.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. A top comprising a spinner member, a shank formed integral with said spinner and extending thereabove, a spindle above said shank, said spindle being of less diameter than the shank and a fly wheel of greater diameter than the spinner member received upon the shank, a plurality of rings adapted to extend around the spindle and be received upon said fly wheel and a pointer upon one of said rings and a series of indicating characters upon the fly wheel as and for the purposes stated.

2. A top comprising a spinner member, a spindle formed integral with said spinner and extending thereabove, a fly wheel of greater outside diameter than the spinner member loosely mounted on said spindle and resting on said spinner member, a plurality of rings adapted to extend around the spindle and be received on said fly wheel and a pointer upon one of said rings and a series of indicating characters upon the fly wheel as and for the purposes stated.

FRANKLIN S. UPHAM.